(12) United States Patent
Takeyama

(10) Patent No.: US 9,559,377 B2
(45) Date of Patent: Jan. 31, 2017

(54) FUEL CELL STACK

(71) Applicant: Makoto Takeyama, Toyota (JP)

(72) Inventor: Makoto Takeyama, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/765,905

(22) PCT Filed: Jan. 24, 2014

(86) PCT No.: PCT/JP2014/051481
§ 371 (c)(1),
(2) Date: Aug. 5, 2015

(87) PCT Pub. No.: WO2014/123006
PCT Pub. Date: Aug. 14, 2014

(65) Prior Publication Data
US 2016/0049681 A1     Feb. 18, 2016

(30) Foreign Application Priority Data

Feb. 7, 2013     (JP) ................................ 2013-022528

(51) Int. Cl.
*H01M 8/24*     (2016.01)
*H01M 8/10*     (2016.01)

(52) U.S. Cl.
CPC ......... *H01M 8/2475* (2013.01); *H01M 8/2465* (2013.01); *H01M 2008/1095* (2013.01);
(Continued)

(58) Field of Classification Search
CPC .............. H01M 8/2475; H01M 8/2465; H01M 2250/20; H01M 2008/1095; Y02T 90/32; Y02E 60/50

See application file for complete search history.

(56) References Cited

U.S. PATENT DOCUMENTS

2009/0101423 A1*    4/2009   Jufuku ..................... B60K 1/04
                                                            180/65.31
2010/0133028 A1*    6/2010   Saito ..................... H01M 8/247
                                                            180/65.31

FOREIGN PATENT DOCUMENTS

JP         2008-269936         11/2008
JP         2009-70674          4/2009
JP         2010-251007         11/2010

* cited by examiner

*Primary Examiner* — Stewart Fraser
(74) *Attorney, Agent, or Firm* — Finnegan, Henderson, Farabow, Garrett & Dunner, LLP

(57) ABSTRACT

The present invention provides a fuel cell stack capable of suppressing misalignment between unit cells that causes gas leakage while achieving low cost and a configuration with a small size and small mass.

A fuel cell stack 10 includes: a stack body 2 in which a plurality of unit cells 20 is stacked; and an external restriction member that suppresses misalignment between the plurality of unit cells 20 in a second direction perpendicular to a first direction in which the plurality of unit cells 20 is stacked. The external restriction member includes: corner restriction members 303, 304, provided so as to extend entirely over at least two corners of the stack body 2 along the first direction; and a rotation suppressing member 305 provided so as to face one side surface of the stack body 2, the side surface being positioned so as to intersect with a direction in which the stack body 2 may rotate about the corner restriction members 303, 304 as a rotation axis when an impact force along the second direction is applied to the stack body 2 from the outside.

6 Claims, 4 Drawing Sheets

(52) U.S. Cl.
CPC .......... *H01M 2250/20* (2013.01); *Y02E 60/50* (2013.01); *Y02T 90/32* (2013.01)

FUEL CELL STACK

CROSS-REFERENCE TO RELATED APPLICATIONS

This application is a national phase application of International Application No. PCT/JP2014/051481, filed Jan. 24, 2014, and claims the priority of Japanese Application No. 2013-022528, filed Feb. 7, 2013, the content of both of which is incorporated herein by reference.

TECHNICAL FIELD

The present invention relates to a fuel cell stack having a stack body in which a plurality of unit cells is stacked.

BACKGROUND ART

In fuel cell stacks having a stack body in which a plurality of unit cells is stacked, in general, a load for fastening is applied by a fastening member in the stacking direction of the unit cells so as to fasten the stack body in order to reduce a contact resistance between unit cells and within each unit cell and to prevent leakage of a fluid (a fuel gas, an oxidant gas and cooling water) flowing within the fuel cell stack.

In such fuel cell stacks, if impact force is applied in a direction perpendicular to the stacking direction of the unit cells and the unit cells are misaligned in the direction perpendicular to the stacking direction due to the impact force, the unit cells may be misaligned to an extent that causes gas leakage. Specifically, examples of misalignments between unit cells that cause gas leakage may include a misalignment which causes a gasket to be twisted or broken or to fall out and a misalignment which causes a manifold of one unit cell to be moved to a position beyond a manifold sealing of an adjacent unit cell. Under such circumstances, various techniques have conventionally been proposed for suppressing misalignment in the direction perpendicular to the stacking direction of unit cells, i.e., for externally restricting a plurality of unit cells.

For example, Patent Document 1 below discloses a technique for providing an external restriction member for suppressing misalignment of a plurality of unit cells, which constitutes a stack body, in a direction perpendicular to the stacking direction. Specifically, a plurality of external restriction members is provided on the stack body in a state where the external restriction members are in contact, entirely across the stacking direction, with surfaces that are parallel to the stacking direction of the stack body.

RELATED ART DOCUMENTS

Patent Documents

Patent Document 1: JP2009-070674 A

DISCLOSURE OF THE INVENTION

Problem to be Solved by the Invention

In the conventional technique referred to above, the plurality of external restriction members is positioned relative to the stack body and fixed thereto in a state where the external restriction members are in contact, entirely across the stacking direction, with the respective four surfaces that are parallel to the stacking direction of the stack body. Each external restriction member functions to suppress misalignment in the surface of the stack body it faces. Thus, even when impact force is applied in the direction perpendicular to the stacking direction of the plurality of unit cells, it is still possible to suppress misalignment in the direction perpendicular to the stacking direction of the unit cells.

However, in order to suppress misalignment between the plurality of unit cells by providing the external restriction members so as to be in contact with the respective four surfaces parallel to the stacking direction of the stack body or so as to face the respective four surfaces with a small gap therebetween, at least four external restriction members corresponding to the respective four surfaces will be needed. In addition, since the four external restriction members function to receive the impact force to be applied to the stack body and suppress the misalignment of the unit cells, the impact force as applied to the stack body will be directly transmitted to any one of the four external restriction members. Thus, in order to suppress all the misalignments in the direction perpendicular to the stacking direction, all the four external restriction members have to have sufficient strength to be able to withstand at least an impact force to be applied from the outside. Since the external restriction members having such sufficient strength to be able withstand at least the impact force from the outside need to have increased cross-sectional areas, their cross-sectional contours will be enlarged, resulting in an increase in the mass and size of the entire stack, as well as in an increase in cost. Although increasing the stiffness of the external restriction members in order to keep the cross-sectional contours from increasing may be one possible way, this would mean that the material of the external restriction members would have to be changed and the cost would subsequently be increased.

The present invention has been made in light of such circumstances and the object of the invention is to provide a fuel cell stack capable of suppressing misalignment between unit cells that causes gas leakage while achieving low cost and a configuration with a small size and small mass.

Means for Solving the Problem

In order to solve the above problem, a fuel cell stack according to the present invention comprises: a stack body in which a plurality of unit cells is stacked; and an external restriction member that restricts misalignment between the plurality of unit cells in a second direction perpendicular to a first direction in which the plurality of unit cells is stacked, wherein the external restriction member includes: corner restriction members provided so as to extend entirely over at least two corners of the stack body along the first direction; and a rotation suppressing member provided so as to face one side surface of the stack body, the side surface being positioned so as to intersect with a direction in which the stack body may rotate about the corner restriction members as rotation axes when an impact force along the second direction is applied to the stack body from outside.

According to the present invention, since the corner restriction members are provided so as to extend entirely over the two corners along the first direction, the corners provided with the corner restriction members are arranged in the direction in which an impact force is applied from the outside and, when the impact force is applied from the outside, the stack body rotates about the corner restriction member as a rotation axis. In the present invention, by arranging the rotation suppressing member so as to face one side surface of the stack body that is positioned so as to intersect with the direction in which the stack body may rotate about the corner restriction member as a rotation axis, it is possible to suppress, by at least two corner restriction members and the rotation suppressing member, gas leakage caused by misalignment between the plurality of unit cells, i.e., it is possible to suppress misalignment that causes gas leakage. Accordingly, there is no need to arrange corner restriction members, each having sufficient strength to withstand the impact force to be applied from the outside, so as to restrict the stack body in all the potential directions in which the stack body may move and it is therefore possible to reduce the number of the corner restriction members.

In the fuel cell stack according to the present invention, it is preferable for the stiffness of the rotation suppressing member to be formed lower than the stiffness of the corner restriction members.

As described above, the rotation suppressing member is a member for suppressing the rotation of the stack body about the corner restriction member as a rotation axis and is a member capable of deforming so as to allow the rotation of the stack body to an extent that does not cause gas leakage from the stack body. In this preferable aspect described above, by configuring the stiffness of the rotation suppressing member so as to be lower than the stiffness of the corner restriction members, it is possible to reduce the mass and the cross-sectional area of the corner restriction members.

In the fuel cell stack according to the present invention, it is preferable that, when the stack body rotates and comes into contact with the rotation suppressing member, the rotation suppressing member is deformed so as to allow misalignment between the plurality of unit cells to an extent that does not cause gas leakage.

By allowing the rotation suppressing member to deform when the stack body rotates and comes into contact with the rotation suppressing member and by configuring such allowable deformation to the extent that does not cause gas leakage from between the unit cells of the stack body, it is possible to prevent the gas leakage, while achieving a reduction in the mass and in the cross-sectional area of the rotation suppressing member.

In the fuel cell stack according to the present invention, it is preferable for the corner restriction members to be provided along both ends of a first side surface along the first direction of the stack body and for the rotation suppressing member to be provided along a second side surface, which opposes the first side surface, of the stack body.

In the preferable aspect described above, since the corner restriction members are provided along both ends of the first side surface, when impact force is applied from the outside, the stack body rotates about, as a rotation axis, either side of the first side surface that is provided with the corner restriction members. By providing the rotation suppressing member along the second side surface that opposes the first side surface, it is possible to securely suppress the rotation of the stack body.

In the fuel cell stack according to the present invention, it is preferable for the rotation suppressing member to comprise one rotation suppressing member, or two or more rotation suppressing members, that is/are provided so as to evenly face a center line along the first direction of the second side surface.

In the preferable aspect described above, since the rotation suppressing member is provided so as to evenly face the center line of the second side surface, even when the stack body rotates about one of the corner restriction members, the rotation of the stack body can be suppressed securely.

In the fuel cell stack according to the present invention, it is preferable for only one rotation suppressing member to be provided substantially along the center line.

In the preferable aspect described above, by providing the rotation suppressing member substantially along the center line, even in the case where only one rotation suppressing member is provided, it is still possible to arrange the rotation suppressing member so as to evenly face the center line of the second side surface and it is therefore possible to securely suppress the rotation of the stack body about either of the corner restriction members.

Effect of the Invention

The present invention can provide a fuel cell stack capable of suppressing misalignment between unit cells that causes gas leakage while achieving low cost and a configuration with a small size and small mass.

BEST MODE FOR CARRYING OUT THE INVENTION

Figure 1:
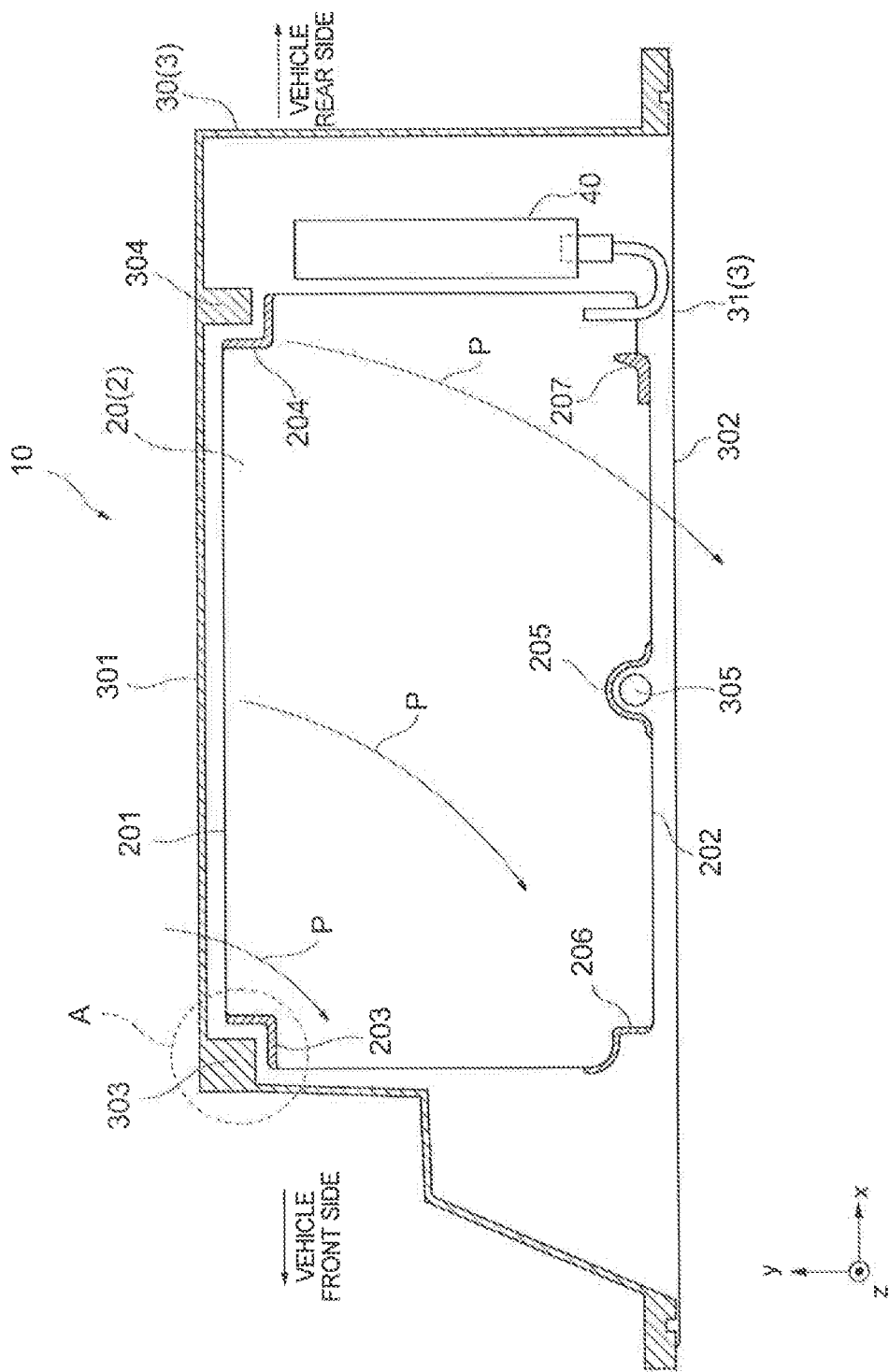
FIG. 1 is a cross-sectional view showing a cross section of a fuel cell stack according to an embodiment of the present invention.

Embodiments of the present invention will now be described below with reference to the attached drawings. In order to facilitate the understanding of explanation, like components in the drawings will be denoted by like reference numerals, wherever possible, and redundant explanation will be omitted.

FIG. 1 is a cross-sectional view showing a schematic configuration of a fuel cell stack 10 according to an embodiment of the present invention. FIG. 1 shows a cross section taken along a unit cell 20, having a flat plate-like shape, substantially near the center of the fuel cell stack 10 having a substantially rectangular parallelepiped shape as a whole. The fuel cell stack 10 includes a plurality of unit cells 20, a case 3 and a voltage monitoring unit 40. It should be noted that, in FIG. 1, axes that are perpendicular to each other in a plane along the paper surface of the drawing are defined as the x-axis and y-axis and an axis along the direction perpendicular to the paper surface is defined as the z-axis. The following description will use, as appropriate, the x-axis (an x-axis direction, a second direction), the y-axis (a y-axis direction) and the z-axis (a z-axis direction, a first direction).

The unit cell 20 is configured such that a membrane-electrode assembly formed by joining an anode and a cathode with the respective sides of an electrolyte membrane having a proton conductivity is sandwiched by separators. In the present embodiment, a solid polymer membrane is used as the electrolyte membrane. Other electrolytes, such as solid oxide electrolytes, may also be used as the electrolyte. It should be noted that the number of membrane-electrode assemblies stacked in the fuel cell stack 10 may be set as appropriate, depending on the output required from the fuel cell stack 10. The plurality of unit cells 20 is stacked along the z-axis direction and constitutes a stack body 2. Accordingly, the z-axis direction also serves as the stacking direction (first direction) of the plurality of unit cells 20.

The case 3 includes a recessed portion 30 and a plate 31. The case 3 is configured such that an opening of the recessed portion 30 is closed with the plate 31. The case 3 is a container for accommodating the stack body 2 in which the plurality of unit cells 20 is stacked, the voltage monitoring unit 40 and other auxiliaries (not explicitly shown) therein. The case 3 has a first surface 301 (a surface defined by a bottom surface of the recessed portion 30) along one longitudinal side of each unit cell 20 having a substantially rectangular cross section and a second surface 302 (a surface defined by the plate 31) that opposes the first surface 301.

A corner restriction member 303 is formed on one side along the z-axis direction of the first surface 301 and a corner restriction member 304 is formed on the other side along the z-axis of the first surface 301. The corner restriction member 303 is formed integrally with the recessed portion 30 as a rod-like portion having a substantially quadrangular cross section. The corner restriction member 304 is formed integrally with the recessed portion 30 as a rod-like portion having a substantially quadrangular cross section. The corner restriction member 303 and the corner restriction member 304 are configured to have a stiffness that can withstand an impact force to be applied from the outside. The stiffness that can withstand the impact force to be applied from the outside refers to a stiffness that is high enough to prevent the corner restriction member 303 from being deformed, even when an impact force applied in the direction perpendicular to the stacking direction of the unit cells 20 causes the movement of the stack body 2 within the case 3 or the misalignment of the unit cells 20 and in turn causes the stack body 2 to directly collide against the corner restriction member 303. The direct collision as used herein refers to a state in which, when an impact force is applied, the stack body 2 first collides against the relevant member (i.e., the corner restriction member 303 in the present embodiment).

In the present embodiment, a rotation suppressing member 305 is configured as a tension shaft that connects opposing walls of the case 3 for pressing the plurality of unit cells 20 from both ends in the stacking direction of the stack body 2. The rotation suppressing member 305 serving as the tension shaft has a strength that allows itself to bend when it receives impact force directly but can still function to connect the opposing walls of the case 3. Specifically, the stiffness of the rotation suppressing member 305 is such that it causes the rotation suppressing member 305 to deform when the stack body 2 directly collides against it as a result of the movement of the stack body 2 within the case 3 or the misalignment of the unit cells 2 due to an impact force applied in the direction perpendicular to the stacking direction of the unit cells 20. In view of the function of the rotation suppressing member 305, the rotation suppressing member 305 does not have to be stiff enough to avoid deformation even when the stack body 2 directly collides against it. However, the rotation suppressing member 305 does have to be stiff enough to avoid deformation when the stack body 2 collides against it on a second occasion after directly colliding against the corner restriction member 303.

Figure 4:
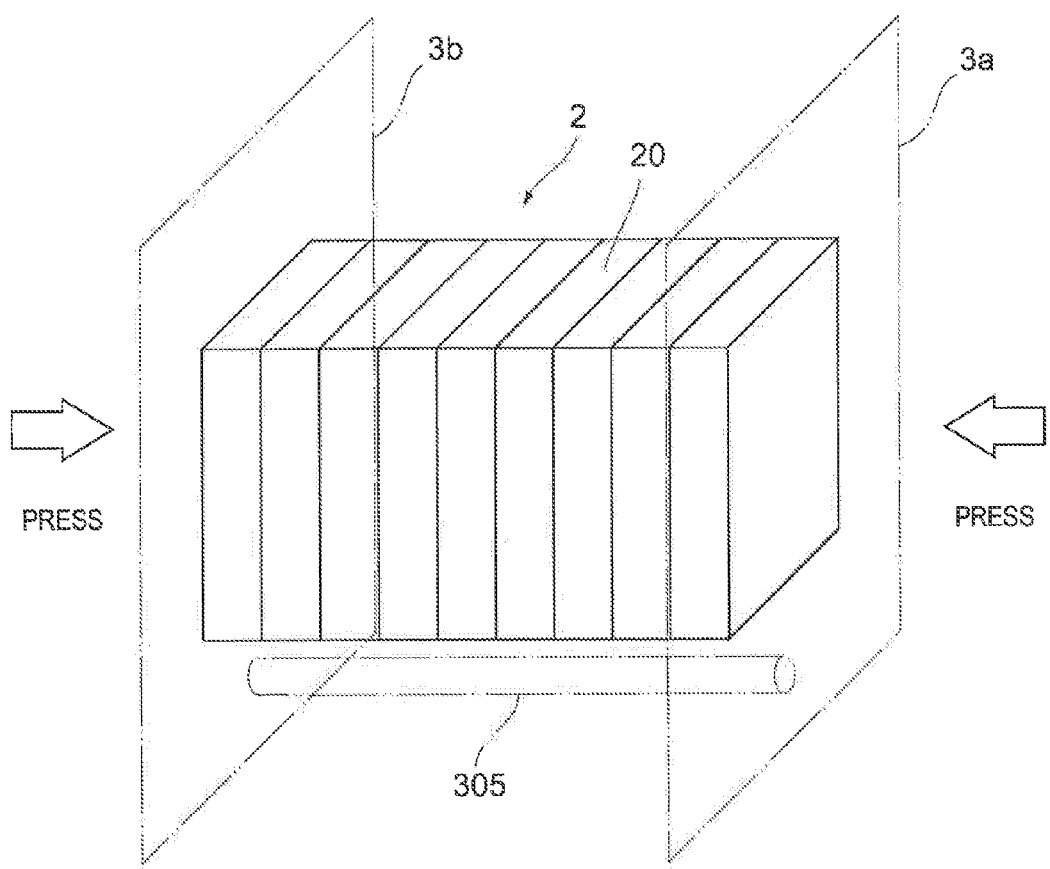
FIG. 4 is a diagram illustrating how a stack body is held in FIG. 1.

FIG. 4 is a diagram illustrating how the stack body 2 is held by the case 3. As shown in FIG. 4, the stack body 2 is pressed and thereby held by a pair of walls 3a and 3b of the case 3. The walls 3a and 3b are connected by the rotation suppressing member 305 serving as the tension shaft. Since the stack body 2 is pressed and thereby held by the walls 3a and 3b, it floats without contacting anything except the walls 3a and 3b. In this way, since the stack body 2 is pressed and held even though it is in such floating state only in contact with the walls 3a and 3b, misalignment between the unit cells 20 can be suppressed and there is no risk of gas leakage during normal use.

Referring back to FIG. 1, the fuel cell stack 10 of the present embodiment is provided in a vehicle such that the left side of the drawing is positioned in the front part of the vehicle, while the right side of the drawing is positioned in the rear part of the vehicle, as shown in FIG. 1. When the vehicle provided with such fuel cell stack 10 crashes into something on its front part, the resulting impact force will be transmitted from the right side toward the left side, which will cause the stack body 2 of the fuel cell stack 10 to collide against the corner restriction member 303, rotate clockwise in a direction P about the corner restriction member 303, and then collide against the rotation suppressing member 305. More specifically, when the vehicle crashes into something on its front part, an upper left corner of the stack body 2 shown in FIG. 1 will collide against the corner restriction member 303. After this collision, although the stack body 2 still keeps moving toward the left side of FIG. 1 due to the impact force, the movement of the upper left corner will be restricted by the corner restriction member 303 and the stack body 2 will then be moved only toward the lower left side in FIG. 1, which will create rotational force that rotates the stack body 2 clockwise in the direction P. On the other hand, when the vehicle provided with the fuel cell stack 10 crashes into something on its rear part, the resulting impact force will be transmitted from the left side toward the right side, which will cause the stack body 2 of the fuel cell stack 10 to collide against the corner restriction member 304, rotate counterclockwise (in the direction opposite to the direction P) about the corner restriction member 304, and then collide against the rotation suppressing member 305. The following description will describe an example case in which the vehicle crashes into something on its front part and the stack body 2 rotates in the direction P.

The corner restriction member 303 and the corner restriction member 303 are provided so as to extend along the respective opposing sides of the first surface 301. Accordingly, one side surface 202 is a surface facing the second surface 302 that is different from the first surface 301 provided with the corner restriction member 303 and the corner restriction member 304.

The functions of the corner restriction members 303, 304 and the rotation suppressing member 305 to restrict the plurality of unit cells 20 when an impact force is applied from the outside are provided for the purpose of suppressing the deflection of the stack body 2 and preventing gas leakage from between the unit cells 20. Specifically, when an impact force is applied from the outside, the floating stack body 2 in the floating state moves and comes into contact with the corner restriction member 303 or corner restriction member 304. This contact causes the stack body 2 to rotate about the corner restriction member 303 or corner restriction member 304 as a rotation axis and collides against the rotation suppressing member 305. As described above with reference to FIG. 4, the stack body 2 is held with a pressing force applied by the wags 3a and 3b, both the ends thereof that are in contact with the walls 3a and 3b are hard to rotate, and the central part thereof, located apart from the walls 3a and 3b, is easy to rotate. Accordingly, the unit cells 20 move greatly in the vicinity of the center of the stack body 2 (in the vicinity of substantially the middle part between the walls 3a and 3b) shown in FIG. 4, while the unit cells 20 (that are in contact with the walls 3a or 3b) move slightly in the vicinity of the ends of the stack body 2. The stack body 2, when viewed as a whole, becomes deflected with both its ends being held by the walls 3a and 3b and the central part thereof being greatly displaced. If such deflected state is not restricted in any way, the misalignment between the unit cells 20 constituting the stack body 2 will become significant enough to cause gas leakage. However, in the present embodiment, the rotation suppressing member 305 provides restriction to thereby suppress misalignment between the unit cells 20 that causes the gas leakage.

Figure 2:
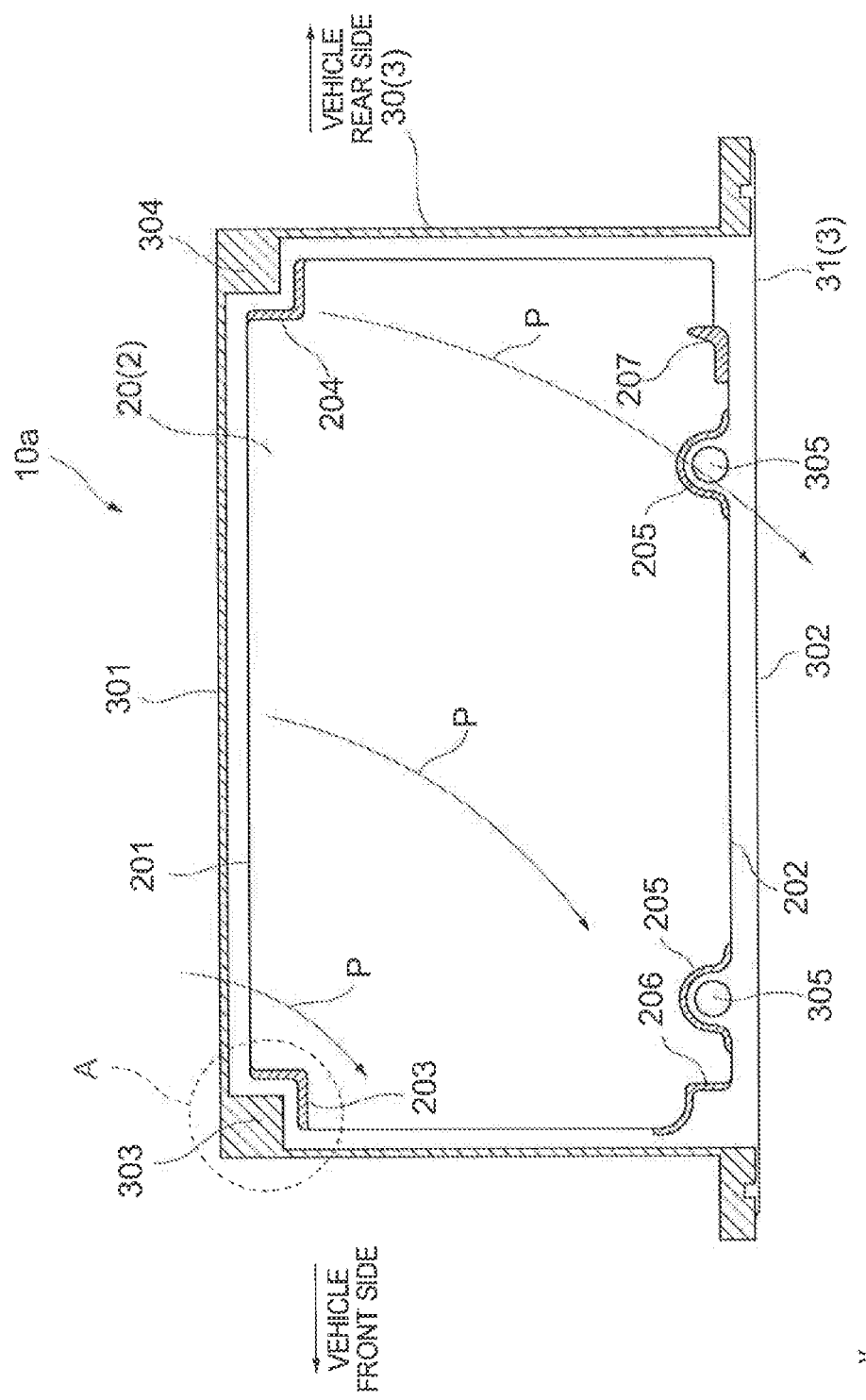
FIG. 2 is a cross-sectional view showing a modification example of the fuel cell stack shown in FIG. 1.

In the present embodiment, the rotation suppressing member 305 is provided along a center line of the side surface 202 (a line extending in the z-axis direction in FIG. 1 and passing through the center of the side surface 202) so as to face the side surface 202 evenly with respect to the center line of the side surface 202. It should be noted that FIG. 2 shows a preferred modification example in which a fuel cell stack 10a is provided with two rotation suppressing members 305. In the modification shown in FIG. 2, a pair of rotation suppressing members 305 is provided along the center line of the side surface 202 (a line extending in the z-axis direction in FIG. 1 and passing through the center of the side surface 202) so as to face the side surface 202 evenly with respect to the center line of the side surface 202.

Each of the plurality of unit cells 20 is provided with shock-absorbing rubber members 203, 204, 205, 206 and 207. The rubber member 203 is provided at a corner facing the corner restriction member 303 and the rubber member 204 is provided at a corner facing the corner restriction member 304. The rubber member 205 is provided at a position facing the rotation suppressing member 305. The rubber members 206 and 207 are provided near corners that are not provided with the rubber members 203 and 204.

Figure 3:
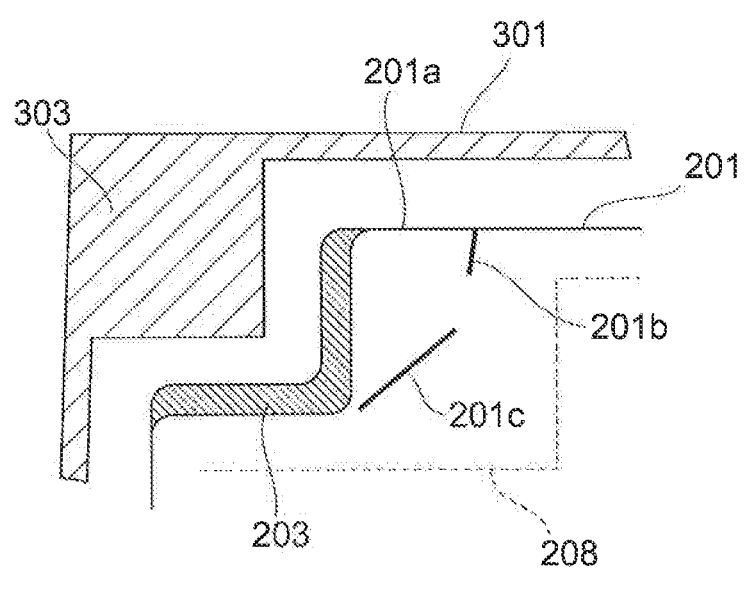
FIG. 3 is a diagram showing a portion A from FIGS. 1 and 2 in an enlarged manner.

FIG. 3 is a diagram showing a portion A in FIGS. 1 and 2 in an enlarged manner. As shown in FIG. 3, a shock-absorbing hole 201a is formed in an end near the rubber member 203 in the side surface 201. By forming such hole 201a, even when a large impact force is applied from the outside, the unit cell 20 will be deformed along polygonal lines 201b and 201c, and it is therefore possible to control the deformation so as not to affect a seal line 208. Such shock-absorbing hole 201a is preferably formed in portions of the unit cells 20 that face the corner restriction members 303, 304 and the rotation suppressing member 305. In particular, it is preferable to provide such shock-absorbing hole 201a in portions of the unit cells 20 that face the corner restriction members 303, 304, as those unit cells 20 strongly interfere with the corner restriction members 303, 304.

As described above, the fuel cell stack 10 according to the present embodiment includes: the stack body 2 in which the plurality of unit cells 20 is stacked; and external restriction members that suppress misalignment between the plurality of unit cells 20 in a second direction (the y-axis direction) perpendicular to a first direction (the z-axis direction) in which the plurality of unit cells 20 is stacked. The external restriction members include: the corner restriction members 303, 304 that are provided so as to extend entirely over at least two corners of the stack body 2 along the first direction; and the rotation suppressing member 305 that is provided so as to face the side surface 202, being one side surface of the stack body 2 that is positioned so as to intersect with a direction in which the stack body 2 may rotate about the corner restriction member 303, 304 as a rotation axis when an impact force in the second direction (the y-axis direction) is applied to the stack body 2 from the outside.

According to the present embodiment, since the corner restriction members 303, 304 are provided so as to face the stack body 2 and extend entirely over the two corners of the stack body 2 along the first direction (z-axis direction), the corners provided with the corner restriction members 303, 304 can be arranged in the direction in which an impact force is applied from the outside and, when such impact force is applied from the outside, the stack body 2 is supposed to rotate about the corner restriction member 303, 304 as a rotation axis. In the present embodiment, the rotation suppressing member 305 is arranged so as to face the side surface 202, being one side surface of the stack body 2 that is positioned so as to intersect with the direction in which the stack body 2 may rotate about the corner restriction member 303, 304 as a rotation axis, so that misalignment between the plurality of unit cells 20 can be suppressed by at least the two corner restriction members 303, 304 and the rotation suppressing member 305. In addition, since it will be sufficient to have the rotation suppressing member 305 formed so as to withstand only the rotary force that still remains after the corner restriction members 303, 304 receives some of the impact force, the rotation suppressing member 305 can be formed with lower stiffness than that of the corner restriction members 303, 304.

In the present embodiment, the corner restriction members 303, 304 are formed integrally with the case 3 as ridge portions having a high stiffness. The corner restriction members 303, 304 are arranged at positions corresponding to both ends of one longitudinal side of the unit cell 2, as shown in FIG. 1. With such arrangement, even when the vehicle provided with the fuel cell stack 10 crashes into something and a very large impact force is generated, the stack body 2 will move, collide against the corner restriction member 303, 304 and then rotate (i.e., a part of the stack body 2 will undergo a deflection) to come into contact with the rotation suppressing member 305, whereby it will be restricted by the rotation suppressing member 305. Consequently, it is possible to prevent gas leakage that would otherwise be caused by misalignment between unit cells.

In the present embodiment, portions of the corner restriction members 303, 304 and portions of the unit cells 20, which face each other, have shapes that are determined so as to form a plane contact therebetween. Such shapes can minimize an adverse effect that could otherwise be exerted on the stack body 2 when the stack body 2 undergoes a deflection and comes into contact with the corner restriction member 303, 304 and the rotation suppressing member 305 to be restricted thereby.

In the present embodiment, the rotation suppressing member 305 is formed so as to have a circular cross section. Such circular cross section can prevent contact with sharp edges. In addition, by providing each of the plurality of unit cells 20 with shock-absorbing rubber members 203, 204 205, 206, 207, the unit cells 20 can be prevented from being deformed.

In the present embodiment, since the corner restriction members 303, 304 are provided at corners, a large area in the unit cell 20 can be devoted to a power generating surface. In the related art, since diagonally notched portions are provided in side surfaces and one member is arranged in each of the notched portions (two members in total), the area of the power generating surface is reduced due to the notched portions. Even if the corners are provided with the two members that can respectively receive all of the impact force on their own, the members have to have increased strength, resulting in an increase in the volume, cost and weight of the fuel cell stack as a whole. On the other hand, by providing the corner restriction members 303, 304 at the corners as in the present embodiment, it is possible to devote a large area in the unit cell 20 to the power generating surface and, in addition, to eliminate causes for increasing the volume, cost and weight.

DESCRIPTION OF REFERENCE NUMERALS

- 2: stack body
- 3: case
- 10: fuel cell stack
- 20: unit cell
- 30: recessed portion
- 31: plate
- 40: voltage monitoring unit
- 201: side surface
- 201*a*: hole
- 201*b*, 201*c*: polygonal line
- 202: side surface
- 203, 204, 205, 206, 207: rubber member
- 208: seal line
- 301: first surface
- 302: second surface
- 303, 304: corner restriction member
- 305: rotation suppressing member

What is claimed is:

1. A fuel cell stack comprising:
   a stack body in which a plurality of unit cells is stacked;
   a case for accommodating the stack body; and
   an external restriction member that restricts misalignment between the plurality of unit cells in a second direction perpendicular to a first direction in which the plurality of unit cells is stacked,
   wherein the external restriction member includes:
   corner restriction members provided in the case so as to extend entirely over at least two corners of the stack body along the first direction; and
   a rotation suppressing member provided in the case so as to face one side surface of the stack body, the side surface being positioned so as to intersect with a direction in which the stack body may rotate about the corner restriction members as rotation axes when an impact force along the second direction is applied to the stack body from outside, and
   wherein the rotation suppressing member is provided in an area that does not contain corners of the stack body.

2. The fuel cell stack according to claim 1, wherein a stiffness of the rotation suppressing member is formed so as to be lower than a stiffness of the corner restriction members.

3. The fuel cell stack according to claim 2, wherein, when the stack body rotates and comes into contact with the rotation suppressing member, the rotation suppressing member is deformed so as to allow misalignment between the plurality of unit cells to an extent that does not cause gas leakage.

4. The fuel cell stack according to claim 1, wherein:
   the corner restriction members are provided along both ends of a first side surface along the first direction of the stack body; and
   the rotation suppressing member is provided along a second side surface, which opposes the first side surface, of the stack body.

5. The fuel cell stack according to claim 4, wherein the rotation suppressing member comprises one rotation suppressing member, or two or more rotation suppressing members, that is/are provided so as to evenly face a center line along the first direction of the second side surface.

6. The fuel cell stack according to claim 5, wherein only one rotation suppressing member is provided substantially along the center line.

* * * * *